United States Patent
Uno

(10) Patent No.: US 7,916,953 B2
(45) Date of Patent: Mar. 29, 2011

(54) REMOVABLE MEDIUM DEVICE, MEDIUM FOR CONTROLLING REMOVABLE MEDIUM DEVICE, AND MEDIUM FOR CONTROLLING NETWORK DEVICE

(75) Inventor: Fumitoshi Uno, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1075 days.

(21) Appl. No.: 11/627,290

(22) Filed: Jan. 25, 2007

(65) Prior Publication Data

US 2007/0177822 A1    Aug. 2, 2007

(30) Foreign Application Priority Data

Jan. 30, 2006    (JP) .................................. 2006-020997

(51) Int. Cl.
  *G06K 9/36*    (2006.01)
  *G06K 9/54*    (2006.01)
  *G06K 9/46*    (2006.01)
(52) U.S. Cl. ........................................ 382/232; 382/305
(58) Field of Classification Search .................. 382/232, 382/233, 305; 345/173, 660, 661, 668, 671; 358/1.13, 1.5, 1.9, 2.1, 451, 530; 715/500, 715/798, 810; 348/152, 552, 553
See application file for complete search history.

(56) References Cited

U.S. PATENT DOCUMENTS

| | | | | |
|---|---|---|---|---|
| 6,052,110 | A * | 4/2000 | Sciammarella et al. | 345/661 |
| 6,996,275 | B2 * | 2/2006 | Edanami | 382/218 |
| 7,158,171 | B1 * | 1/2007 | Ichihara | 348/207.2 |
| 7,286,145 | B2 * | 10/2007 | Sunata | 345/671 |
| 7,292,369 | B2 * | 11/2007 | Yokoyama et al. | 358/1.9 |
| 2004/0205473 | A1 * | 10/2004 | Fisher et al. | 715/500 |
| 2005/0062888 | A1 * | 3/2005 | Wood et al. | 348/553 |
| 2006/0087668 | A1 * | 4/2006 | Takahashi | 358/1.13 |
| 2006/0250632 | A1 * | 11/2006 | Tashiro | 358/1.13 |
| 2007/0177822 | A1 * | 8/2007 | Uno | 382/305 |

FOREIGN PATENT DOCUMENTS

| | | |
|---|---|---|
| JP | 2000125251 A | 4/2000 |
| JP | 2004172842 A | 6/2004 |
| JP | 2004-272800 A | 9/2004 |
| JP | 2005-339053 A | 12/2005 |

OTHER PUBLICATIONS

Japanese Patent Office, Notification for Reasons of Rejection dated Jul. 25, 2008, for related Patent Application No. JP 2006-020997.

* cited by examiner

*Primary Examiner* — Amir Alavi
(74) *Attorney, Agent, or Firm* — Baker Botts L.L.P.

(57) ABSTRACT

A removable medium device, configured to transmit information stored in a removable medium via a network based on a predetermined communication protocol, includes a reduced image generating system that reduces each of a plurality of original images in the removable medium and generate a reduced screen image in which the plurality of reduced images are arranged, an image file generating system that generates an image file including the reduced screen image and image specifying information for specifying an original image in the removable medium for each of the plurality of reduced images, an image file sending system that sends the image file via the network, and an original image sending system that, in response to receiving image specifying information by which one of the plurality of original images in the removable medium is specified, sends the original image specified by the received image specifying information.

18 Claims, 6 Drawing Sheets

REMOVABLE MEDIUM DEVICE, MEDIUM FOR CONTROLLING REMOVABLE MEDIUM DEVICE, AND MEDIUM FOR CONTROLLING NETWORK DEVICE

CROSS-REFERENCE TO RELATED APPLICATION

This application claims priority under 35 U.S.C. §119 from Japanese Patent Application No. 2006-020997, filed on Jan. 30, 2006. The entire subject matter of the application is incorporated herein by reference.

BACKGROUND

1. Technical Field

The following description relates to one or more removable medium devices, media for controlling the removable medium devices, and media for controlling a network device, and particularly relates to those which make it possible to display a reduced image of an original image stored in a removable medium.

2. Related Art

Image data taken by a digital camera are stored in a removable memory card (removable medium). The memory card is inserted into a card reader (removable medium device) connected with a network, and information stored in the memory card is read out to be transmitted to a computer connected with the network.

In the digital camera, there is installed a thumbnail display function that allows to display a plurality of reduced images of original images taken by the digital camera on a screen and to refer to an order in which the plurality of images have been taken.

In Japanese Patent Provisional Publication No. 2004-172842, there is disclosed a device, configured as a direct printer that can directly print images taken by a digital camera from a memory card attached to a main body thereof, which saves the image data stored in the memory card in a storage device of a computer via a network.

Further, in Japanese Patent Provisional Publication No. 2000-125251, there is disclosed a technique to generate, store, and display thumbnail images in a digital camera.

However, there is a problem that it is impossible to send and receive the thumbnail images in a network in which network communication is performed based on an FTP (File Transfer Protocol).

SUMMARY

Aspects of the present invention are advantageous in that there can be provided one or more improved removable medium devices, media for controlling the removable medium devices, and media for controlling a network device that make it possible to acquire thumbnail images of original images stored in a removable medium attached to the removable medium device connected with a network based on an FTP.

BRIEF DESCRIPTION OF THE ACCOMPANYING DRAWINGS

FIG. 1 is a block diagram showing a configuration of a communication system provided with an MFP (Multi Function Peripheral) and a PC (Personal Computer) interconnected via an LAN (Local Area Network) in accordance with one or more aspects of the present invention.

FIG. 2 schematically shows processes executed by the MFP and the PC in accordance with one or more aspects of the present invention.

Figure 4:
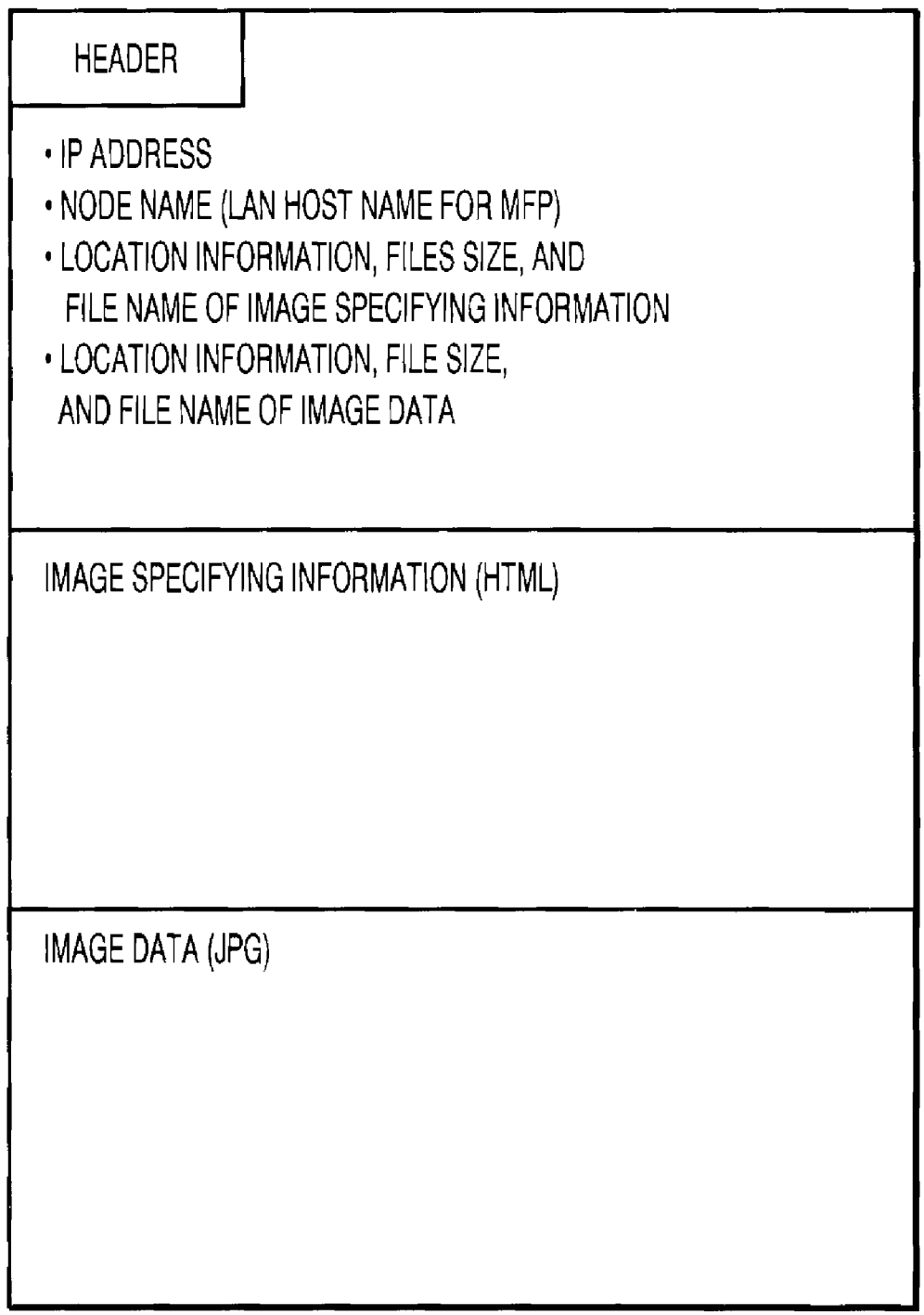

FIG. 4 schematically shows a configuration of the thumbnail image file in accordance with one or more aspects of the present invention.

Figure 5:
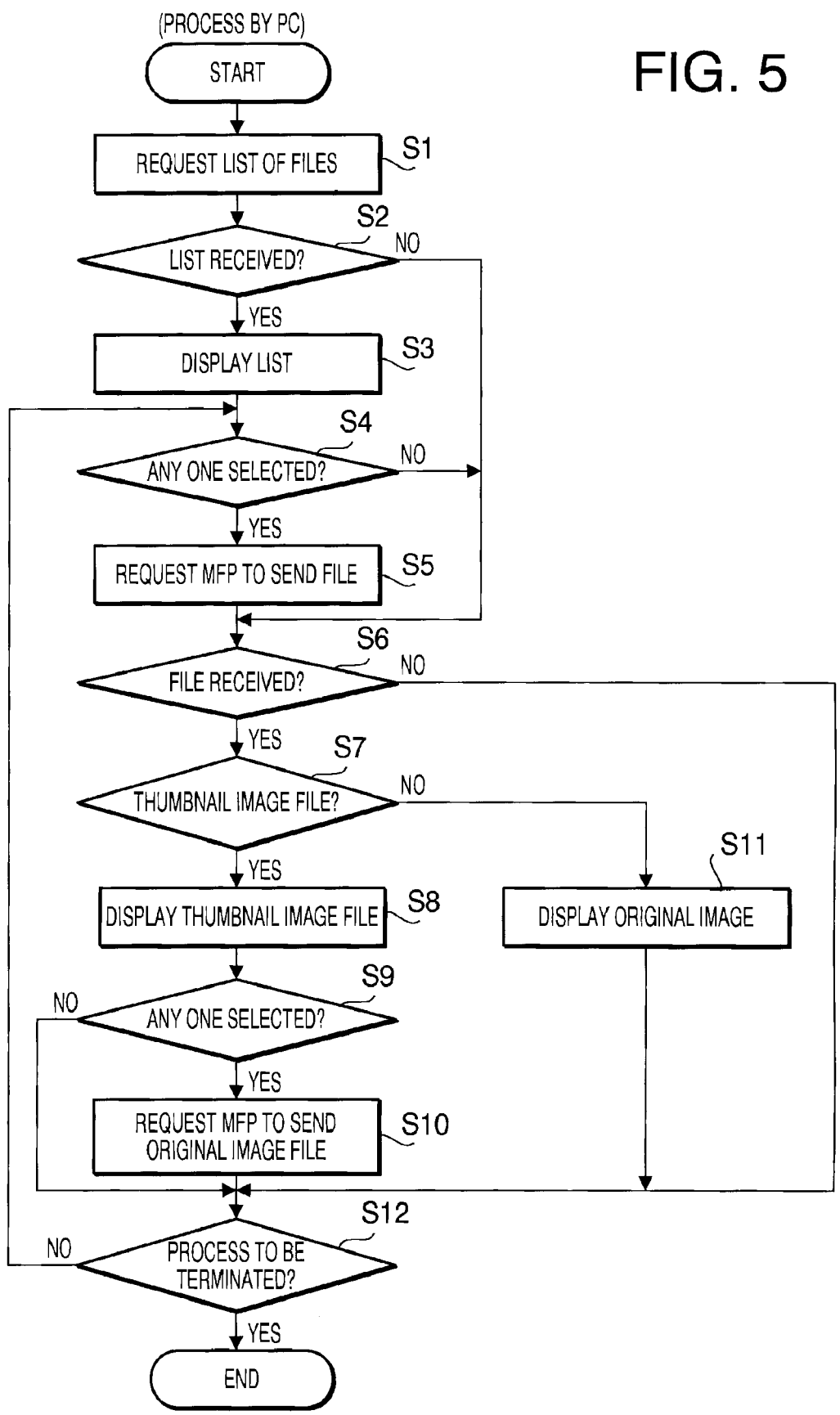

FIG. 5 is a flowchart showing a process by the PC in accordance with one or more aspects of the present invention.

Figure 6:
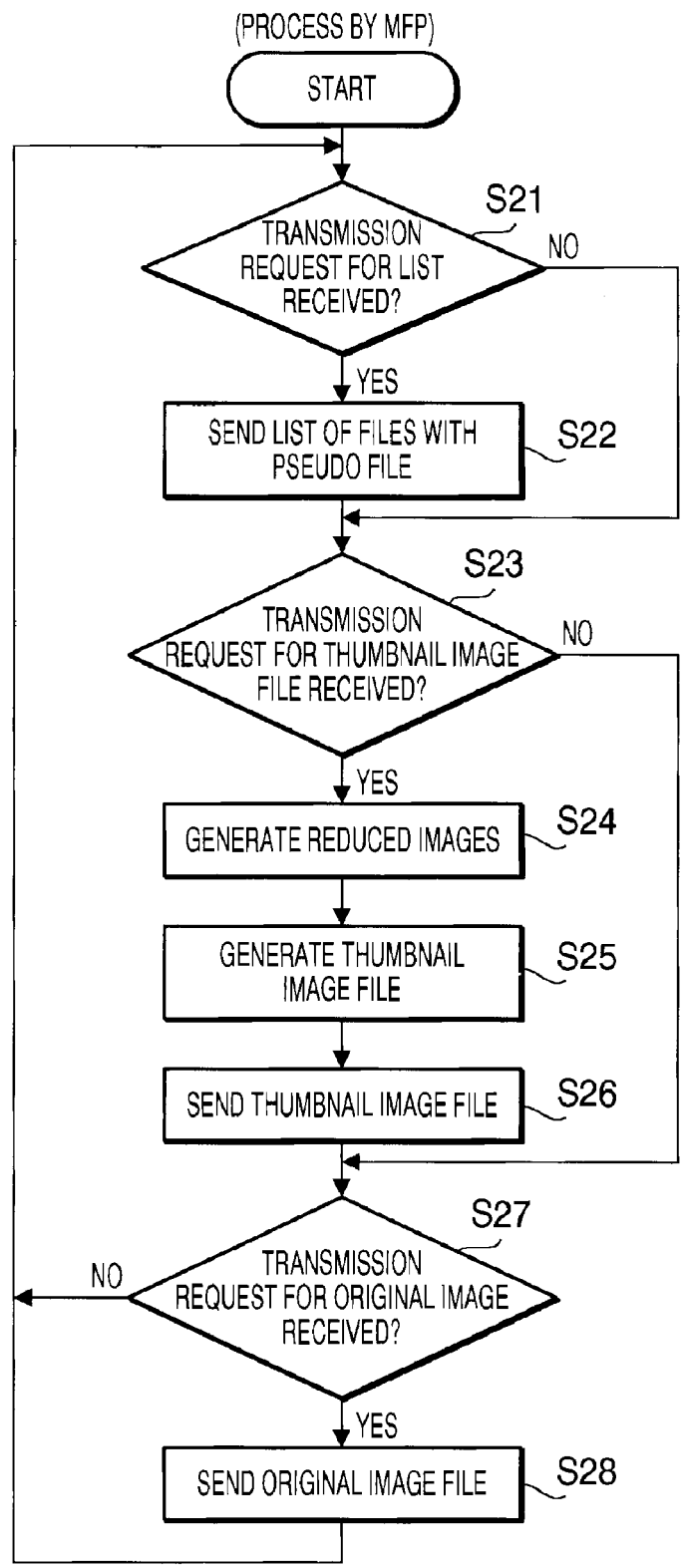

FIG. 6 is a flowchart showing a process by the MFP in accordance with one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

General Overview

According to aspects of the present invention, there is provided a removable medium device configured to transmit information stored in a removable medium via a network based on a predetermined communication protocol, which comprises: a reduced image generating system configured to reduce each of a plurality of original images stored in the removable medium and generate a reduced screen image in which the plurality of reduced images are arranged; an image file generating system configured to generate an image file that includes the reduced screen image generated by the reduced image generating system and image specifying information for specifying an original image in the removable medium for each of the plurality of reduced images arranged in the reduced screen image; an image file sending system configured to send the image file generated by the image file generating system via the network; and an original image sending system configured, in response to receiving image specifying information by which one of the plurality of original images stored in the removable medium is specified, to send the original image specified by the received image specifying information.

According to some aspects, an external device connected with the network can display the plurality of reduced images and select one of them, so as to request the removable medium device to send an original image corresponding to the selected one of the plurality of reduced images. Therefore, it is very convenient that a user can select a desired image at a side of the external device with reference to the plurality of reduced images, and make the external device display the selected original image.

Optionally, the removable medium device may be configured to transmit information stored in the removable medium via the network based on an FTP (File Transfer Protocol).

According to some aspects, it is very convenient that the reduced screen image including the plurality of reduced images can be transmitted via the network based on the FTP that has conventionally and widely been used.

Optionally, the reduced image generating system may be configured to generate the reduced screen image based on a JPEG (Joint Photographic Experts Group) format. Optionally, the image specifying information included in the image file generated by the image file generating system may be written in a web descriptive language.

According to some aspects, the reduced screen image, which is formed based on the JPEG format that is a general-purpose format for a still image taken by a digital camera, can be displayed with a general-purpose browser. In addition, the image specifying information can be processed with a general-purpose browser.

Optionally, the image file generated by the image file generating system may include a memory location of the reduced screen image in the image file and a memory location of the image specifying information in the image file.

According to some aspects, since the image file generated by the image file generating system includes the memory location of the reduced screen image in the image file and the memory location of the image specifying information in the image file, it is easy for the external device that has received the image file to extract the reduced screen image and the image specifying information separately from the image file.

Optionally, the image file generated by the image file generating system may include a network address of the removable medium device.

According to some aspects, the external device that has received the image file can easily access the removal medium device based on the network address of the removable medium included in the image file.

According to another aspect of the present invention, there is provided a computer usable medium containing computer readable instructions that cause a computer to control a removable medium device, configured to transmit information stored in a removable medium via a network based on a predetermined communication protocol, so as to: reduce each of a plurality of original images stored in the removable medium; generate a reduced screen image in which the plurality of reduced images are arranged; generate an image file that includes the reduced screen image generated by the reduced image generating system and image specifying information for specifying an original image in the removable medium for each of the plurality of reduced images arranged in the reduced screen image; send the image file generated by the image file generating system via the network; and in response to receiving image specifying information by which one of the plurality of original images stored in the removable medium is specified, send the original image specified by the received image specifying information.

According to the computer usable medium configured as above, the same effects as the aforementioned removable medium device can be expected.

According to a further aspect of the present invention, there is provided a computer usable medium containing computer readable instructions for controlling a network device connected with a removable medium device configured to transmit information stored in a removable medium via a network based on a predetermined communication protocol, the network device including a receiving system configured to receive the information stored in the removable medium via the network and a display system configured to display the information received by the receiving system, the instructions causing a computer to control the network device so as to: receiving an image file sent by the removable medium device, the image file including a reduced screen image with a plurality of reduced images generated by reducing a plurality of original images stored in the removable medium being arranged therein and image specifying information for specifying an original image in the removable medium for each of the plurality of reduced images; extracting the reduced screen image and the image specifying information separately from the image file; displaying the reduced screen image extracted from the image file on the display system; and in response to one of the plurality of reduced images included in the reduced screen image being selected, requesting the removable medium device to send an original image corresponding to the selected reduced image based on the image specifying information.

According to some aspects, the network device connected with the network can display the plurality of reduced images and select one of them, so as to request the removable medium device to send an original image corresponding to the selected one of the plurality of reduced images. Therefore, it is very convenient that the user can select a desired image at a side of the network device with reference to the plurality of reduced images, and make the network device display the selected original image.

Optionally, the instructions may cause the computer to control the network device so as to receive the image file sent by the removable medium device via the network based on an FTP (File Transfer Protocol).

According to some aspects, it is very convenient that the reduced screen image including the plurality of reduced images can be transmitted via the network based on the FTP that has conventionally and widely been used.

Optionally, the reduced screen image may be generated based on a JPEG (Joint Photographic Experts Group) format. Optionally, the image specifying information included in the image file may be written in a web descriptive language.

According to some aspects, the reduced screen image, which is formed based on the JPEG format that is a general-purpose format for a still image taken by a digital camera, can be displayed with a general-purpose browser. In addition, the image specifying information can be processed with a general-purpose browser.

Optionally, the image file may include a memory location of the reduced screen image in the image file and a memory location of the image specifying information in the image file. In this case, the instructions may cause the computer to control the network device so as to display the reduced screen image extracted from the image file on the display system based on the memory location of the reduced screen image and the memory location of the image specifying information included in the image file.

According to some aspects, since the image file generated by the image file generating system includes the memory location of the reduced screen image in the image file and the memory location of the image specifying information in the image file, it is easy for the network device that has received the image file to extract the reduced screen image and the image specifying information separately from the image file.

Optionally, the image file may include a network address of the removable medium device. In this case, the instructions may cause the computer to control the network device so as to request the removable medium device to send the original image corresponding to the selected image based on the image specifying information and the network address of the removable medium device.

According to some aspects, the network device that has received the image file can easily access the removal medium device based on the network address of the removable medium included in the image file.

According to a further aspect of the present invention, there is provided a removable medium device configured to transmit information stored in a removable medium via a network based on a predetermined communication protocol, the removable medium device being connected with an external device via the network, the removable medium device comprising: a pseudo file generating system configured to generate a pseudo file representing reduced images to be generated by reducing a plurality of original images stored in the removable medium in response to a request for a list of files stored in the removable medium issued from the external device; a pseudo file sending system configured to send the pseudo file generated by the pseudo file generating system to the external device; a reduced image generating system configured to reduce each of a plurality of original images stored in the removable medium and generate a reduced screen image in which the plurality of reduced images are arranged, in response to the pseudo file being selected at a side of the external device; an image file generating system configured to generate the image file that includes the reduced screen image generated by the reduced image generating system and image specifying information for specifying an original image in the removable medium for each of the plurality of reduced images arranged in the reduced screen image; an image file sending system configured to send the image file generated by the image file generating system to the external device via the network; and an original image sending system configured to send, to the external device via the network, an original image corresponding to a reduced image that has been selected on the reduced screen image displayed at the side of the external device.

According to the removable medium device configured as above, the same effects as the aforementioned removable medium device or the computer usable media can be expected.

Illustrative Aspects

Figure 1:
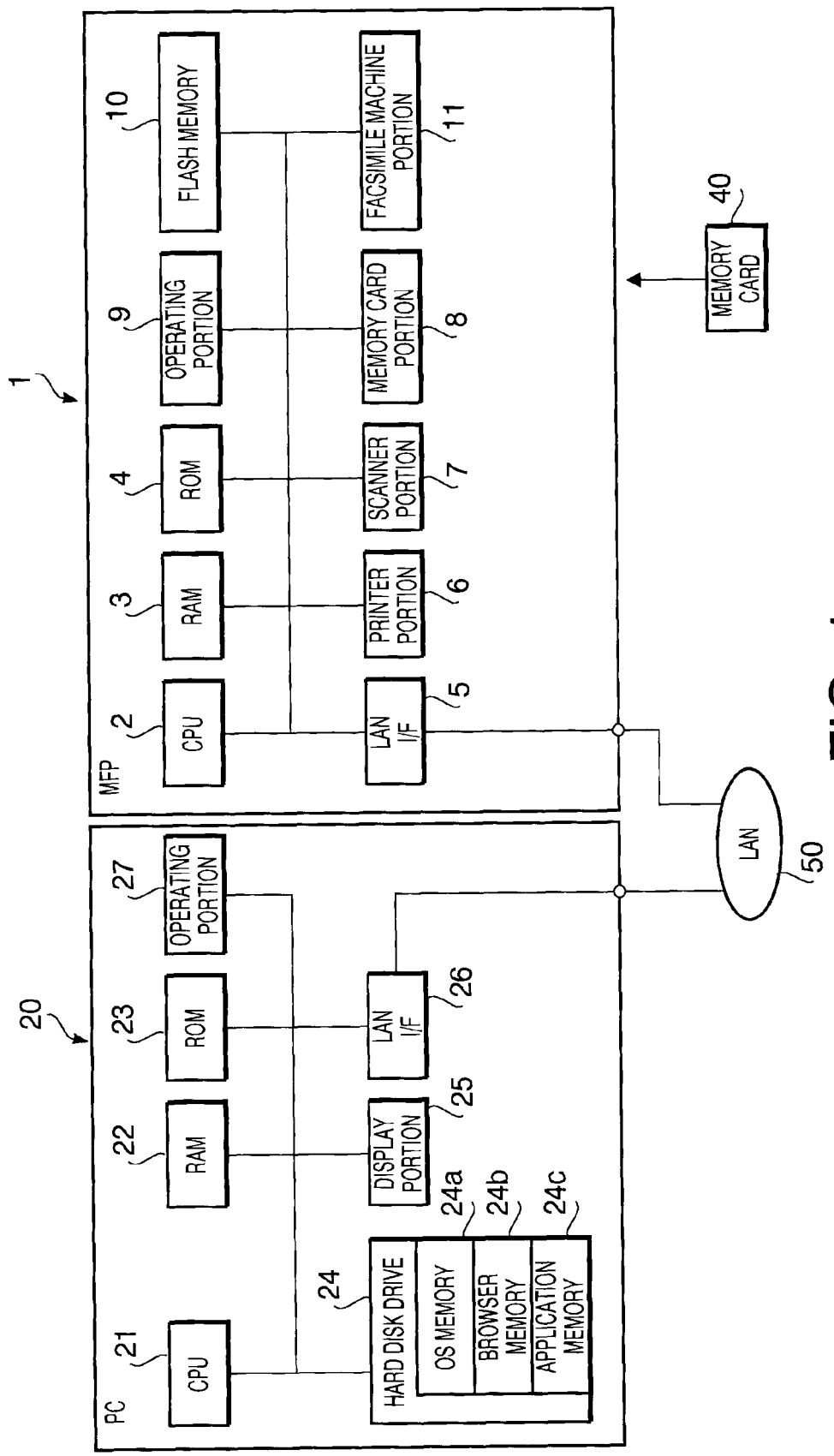

Hereinafter, illustrative aspects according to the present invention will be described with reference to the accompanying drawings. FIG. 1 is a block diagram showing a configuration of a communication system provided with an MFP (Multi Function Peripheral) 1 and a PC (Personal Computer) 20 interconnected via an LAN (Local Area Network) 50 in an embodiment according to the present invention.

The MFP 1 is provided with various functions such as a direct print function, printer function, copy machine function, scanner function, and facsimile machine function. As shown in FIG. 1, The MFP 1 includes a CPU 2 that controls whole operations of the MFP 1, a RAM 3 as a memory for temporarily storing data necessary for various processes executed by the CPU 2, a RAM 4 that stores various control programs executed by the CPU 2 and constant value data therein, a LAN interface (hereinafter, referred to as a "LAN I/F") 5, a printer portion 6, a scanner portion 7, a memory card portion 8, an operating portion configured with a plurality of operation input keys such as buttons and switches for making the MFP 1 execute the various functions and a display device, a flash memory 10, a facsimile machine portion 11 that send and receive image data via a telephone line (not shown).

The CPU 2 is a processor that executes the various programs stored in the ROM 4. The RAM 3 is a random access memory with a work area that temporarily stores parameters when the CPU 2 executes the various programs. The programs stored in the ROM 4 includes a thumbnail image generating program for generating thumbnail images that are reduced images, to be displayed on a screen, of a plurality of original images such as photographs stored in the memory card 40 attached to the memory card portion 8, and a communication program for transmitting the thumbnail images and the original images of the thumbnail images via the LAN 50 in response to a transmission request from the PC 20.

The operating portion 9 is provided with a plurality of switches and a display device on an operating panel, and an instruction is transmitted to the MFP 1 with a user operating the switches. The plurality of switches include mode selecting keys for selecting one of the various functions such as the direct print function, copy machine function, scanner function, facsimile machine function, and a numeric key pad for inputting numerical values and/or characters. By operating one of the mode selecting keys, a corresponding one of various modes, such as a direct print mode for carrying out the direct print function, a copy mode for carrying out the copy machine function, a scanner mode for carrying out the scanner function, and a facsimile mode for carrying out the facsimile machine function, can be set.

In addition, by operating the numeric key pad, it is possible to input a destination number for facsimile transmission and input a number of copies in the copy mode. The display device is for displaying a setting screen image showing various numerical values as configured.

The flash memory 10 is a non-volatile memory that can read and write various data, in which there are stored a network address (IP address) and/or a node name of the MFP 1 in the LAN 50.

The LAN I/F 5 is an interface through which the network communication is performed via the LAN 50. It is noted that, in the embodiment, the network communication is performed based on an FTP (File Transfer Protocol) as a protocol for file transfer. In the direct copy mode, data on images and/or documents stored in the memory card 40 attached to the memory card portion 8 can be transmitted to the PC 20 connected with the LAN 50 via the LAN I/F 5.

The printer portion 6 is configured with a inkjet type printer that performs a printing operation on a recording paper set in a predetermined paper feed position, which includes a recording paper feeding motor (not shown) for feeding the recording paper, print head (not shown) that discharges ink to the recording paper, and a carriage motor for moving a carriage (not shown) on which the print head is mounted. In the direct print mode, it is possible to directly print the data on the images and/or documents stored in the memory card 40 attached to the memory card portion 8.

The scanner portion 7 reads an image of an original set in a predetermined scanning position (not shown) based on an instruction from the CPU 2. In the copy mode, image data generated by the scanner portion 7 are printed on the recording paper by the printer portion 6. Additionally, in the scanner mode, image data generated by the scanner portion 7 are stored in a predetermined memory area of the RAM 3, and further transmitted to the PC 20 via the LAN 50.

The memory card portion 8, provided with a plurality of slots into which various memory cards 40 can detachably be inserted, can read out the data stored in the memory cards 40 inserted into the respective slots and write predetermined data into the memory cards 40. In the direct print mode, it is possible to read out the data stored in the memory card 40 inserted thereinto and print the data as read out with the printer portion 6, and further to transmit the data as read out to the PC 20 via the LAN 50. The memory card 40 is configured with a rewritable flash memory that holds data stored therein even when an electrical power supply is blocked. Various types of memory cards 40 such as an SD card and xD card are supplied as the rewritable flash memory from some companies.

The memory card 40 is provided with a data memory that stores image data taken by a digital camera and text data generated by a computer therein.

The facsimile portion 11 can transmit, via the telephone line, image data read out by the scanner portion 7 and data received via the LAN 50, and print data received via the telephone line by the printer portion 6, or send the data received via the telephone line to the PC 20 via the LAN 50.

Next, the PC 20 will be explained. The PC 20 includes a CPU 21, RAM 22 that temporally stores data and programs necessary for various processes executed by the CPU 21, ROM 23 that stores various control programs executed by the CPU 21 and constant value data, hard disk drive 24 as a non-volatile rewritable memory that stores various settings, operating portion 27 configured with a key board having a plurality of operation input keys for setting various functions and a mouse, a display device 25 configured with a liquid crystal display for displaying various information, and a LAN I/F 26 as a LAN interface for connecting to the LAN 50.

The hard disk drive 24 is provided with an OS memory 24a that stores an OS (Operating System), browser memory 24b that stores a web browser, and application memory 24c that stores various application programs (hereinafter, simply referred to as "applications"). One of the applications is an application for executing a thumbnail image display process. The application executes processes of receiving a thumbnail image file including thumbnail images and file names of original images from the MFP 1 via the LAN 50, displaying the thumbnail images separated from the thumbnail image file on the display device 25, requesting the MFP 1, in response to any of the thumbnail images being selected through the mouse, to transmit the original image corresponding to the selected thumbnail image, and displaying the original image in response to the original image being transmitted from the MFP 1.

Figure 2:
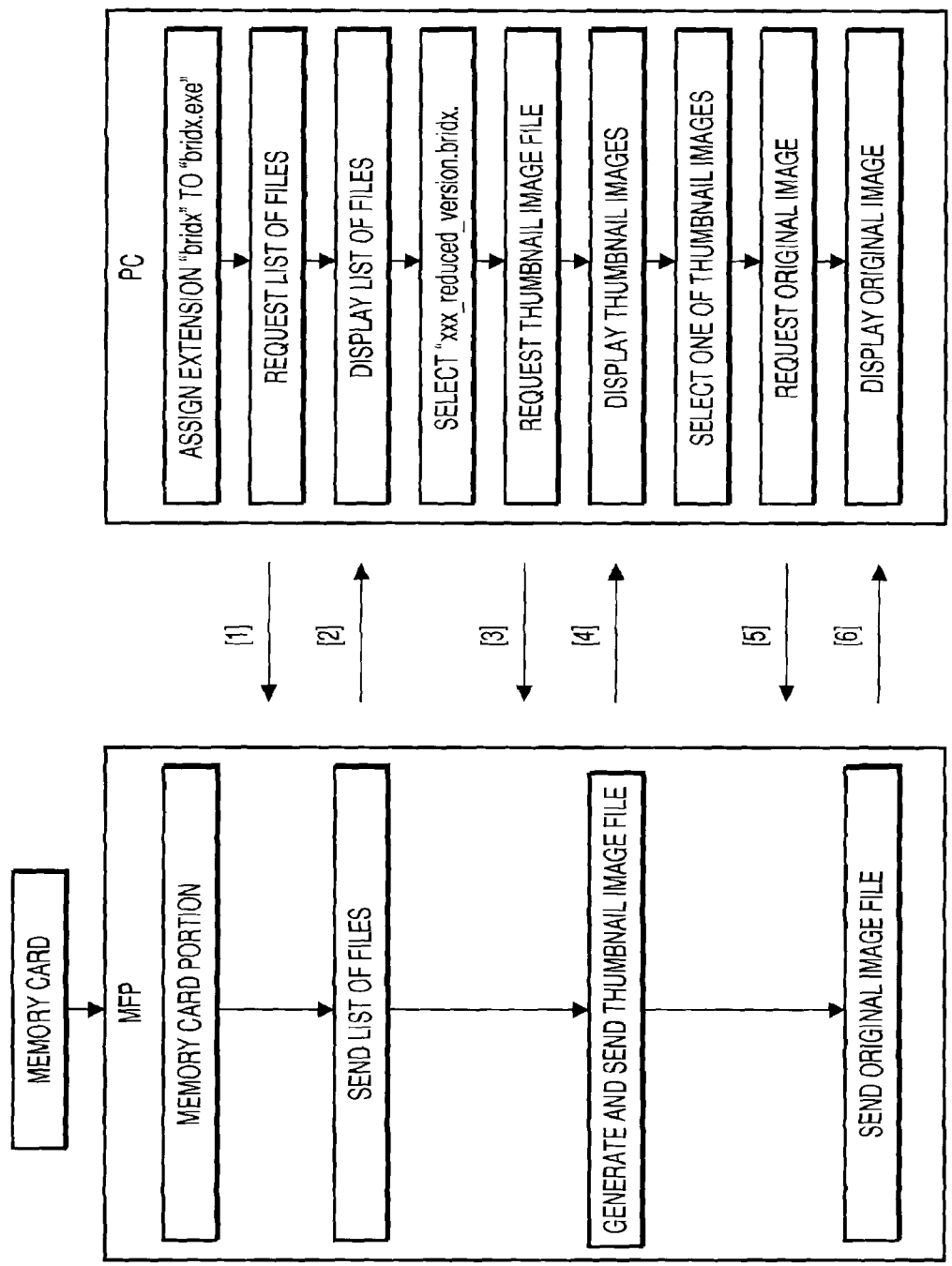
Figure 3A:
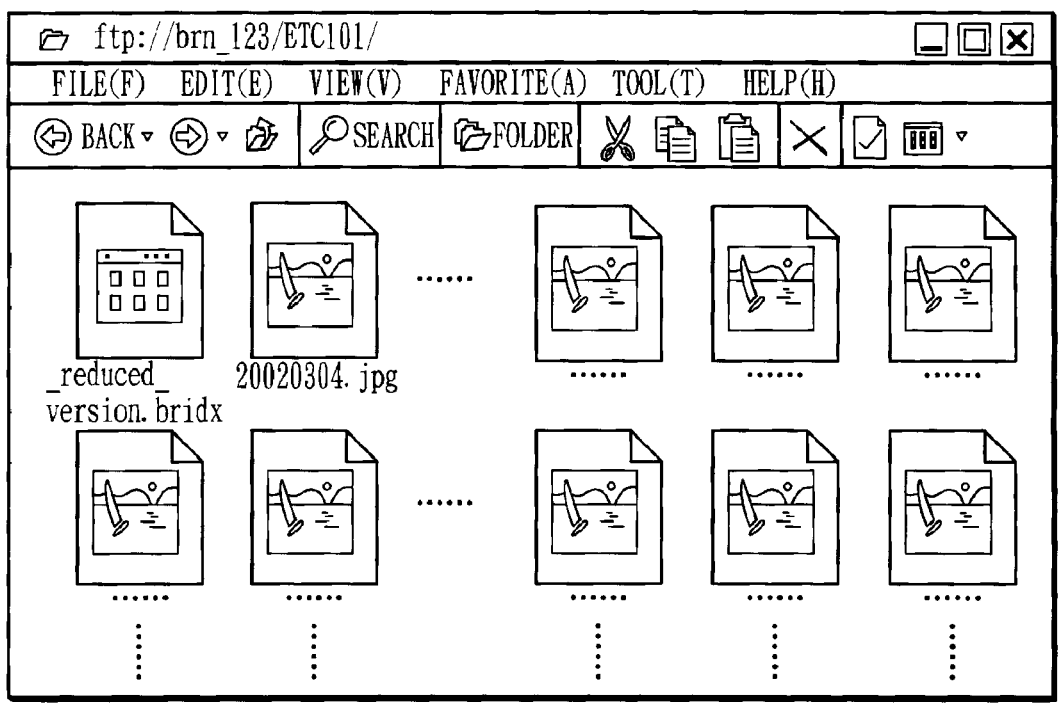
FIG. 3A shows an example of a screen image including icons of image files to be displayed on a display device of the PC in accordance with one or more aspects of the present invention.
Figure 3B:
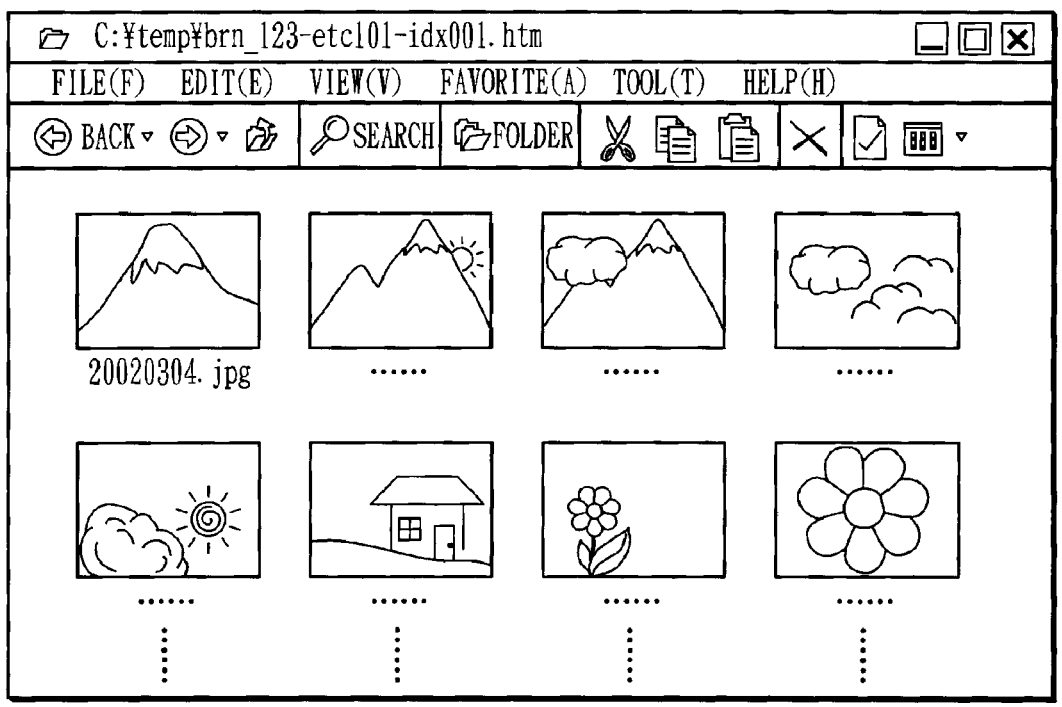
FIG. 3B shows an example of a screen image including a plurality of thumbnail images to be displayed on the display device of the PC in accordance with one or more aspects of the present invention.

Subsequently, with reference to FIGS. 2 to 4, an outline of processes executed by the MFP 1 and the PC 20 will be explained. FIG. 2 schematically shows processes executed by the MFP 1 and the PC 20. FIGS. 3A and 3B are screen images to be displayed on the display device of the PC 20. FIG. 4 schematically shows a configuration of the thumbnail image file.

As shown in FIG. 2, in the PC 20, when the applications are installed, an extension "bridx" is assigned to (associated with) an application "bridx.exe". When a network photo capture icon displayed on a desktop is double-clicked, the web browser is launched. The web browser requests a list of files of the MPF 1 [1]. The MFP 1 transmits a list of files stored in the memory card 40 along with a pseudo file of reduced images of all of the image files to the PC 20 [2]. After analyzing the files with one of the applications as installed, the PC 20 controls the browser to display an icon "xxx_reduced_version.bridx" of the pseudo file and icons of other image files on the screen. Each of the icons as displayed is expressed as a graphic symbol abstractly denoting an image of a corresponding image file. FIG. 3A shows an example of the screen image to be displayed on the display device of the PC 20, and an icon displayed with a file name "xxx_reduced_version.bridx" in an upper left position is the icon of the pseudo file.

When any of the icons is double-clicked by the user, the web browser requests the MFP 1 to transmit a file of an original image corresponding to the icon as double-clicked [3].

At this time, when the icon of the pseudo file for the thumbnail image is specified, the MFP 1 generates a thumbnail image as a reduced image of each of a plurality of images stored in the memory card 40, and then generates a thumbnail image including the plurality of thumbnail images to be displayed on a page, so as to transmit the thumbnail image of the plurality of thumbnail images to the PC 20 [4]. As shown in FIG. 4, the thumbnail image file includes image data based on a JPEG (Joint Photographic Experts Group) format that includes the reduced images of the plurality of images stored in the memory card 40, image specifying information, written in a web descriptive language such as an HTML (HyperText Markup Language), which specifies the original image file corresponding to each of the plurality of thumbnail images, and a header. In the header, there are stored an IP address and node name of the MFP 1, a memory location in the file, file size, and file name of the image specifying information, and a memory location in the file, file size, and file name of the image data.

After receiving the thumbnail image file, the PC 20 executes "xxx_reduced_version.bridx" with the application "bridx.exe" to which the extension "bridx" is assigned. Then, the PC 20 extracts the image data and the image specifying information separately from the thumbnail image file, and controls the browser to display the thumbnail image based on the image data as extracted. A screen image thus displayed is shown in FIG. 3B. Since the thumbnail images as reduced images of the respective original images are displayed on the screen, the user can select an image with reference to the reduced images.

When any of the plurality of thumbnail images displayed with the browser is clicked, a location where the thumbnail image as selected is displayed is detected, and a file name of an original image file stored associated with the location is specified with reference to the image specifying information. The PC 20 requests the MFP 1 to transmit the original image file based on the file name [5]. In response to the transmission request, the MFP 1 sends the specified file [6], and the PC 20 displays the image of the file with the browser.

Hereinabove, the outline of the processes executed by the MFP 1 and the PC 20 has been explained. Next, a process by the PC 20 will be explained with reference to FIG. 5, and a process by the MFP 1 will be explained with reference to FIG. 6. Firstly, a process by the PC 20 will be described. FIG. 5 is a flowchart showing a process by the PC 20.

The process by the PC 20 is started by launching the web browser. Firstly, the web browser requests the list of the files of the MFP 1 (S1). Subsequently, it is judged whether the list of the files stored in the memory card 40 and the pseudo file for the reduced images of all of the image files has been received (S2). When the list has been received (S2: Yes), the PC 20 analyzes the files with the application, and controls the browser to display the icon of the pseudo file and the icons of the other image files on the screen (S3).

Then, it is judged whether any of the icons is clicked (S4). When any of the icons is clicked (S4: Yes), the PC 20 requests the MFP 1 to transmit a file corresponding to the selected icon (S5).

After the step of S5 has been completed, or when any of the icons is not clicked in the step of S4 (S4: No), it is judged whether the image file has been received (S6). When the image file has been received (S6: Yes), it is judged whether the received image file is the thumbnail image file (S7). When the received image file is the thumbnail image file (S7: Yes), the thumbnail image, including the plurality of thumbnail images to be displayed on a page, is displayed (S8), and it is judged whether any of the plurality of thumbnail images is clicked (S9). When any of the plurality of thumbnail images is clicked (S9: Yes), the PC 20 requests the MFP 1 to transmit the original image file corresponding to the selected one of the plurality of thumbnail images (S10).

In the step of S9, when what is selected is not any of the plurality of thumbnail image files but any of the other image files (S7: No), an original image corresponding to the selected image file is displayed (S11). After the step of S10 has been completed, or after the step of S11 has been completed, or when any of the plurality of thumbnail images has not been clicked (S9: No), it is judged whether an instruction for terminating the process by the web browser has been issued (S12). When the instruction for terminating the process has been issued (S12: Yes), the process is terminated. Meanwhile, when the instruction has not been issued (S12: No), the process goes back to the step of S4.

Next, with reference to FIG. 6, a process by the MFP 1 will be described. FIG. 6 is a flowchart showing a process by the MFP 1.

In the process by the MFP 1, firstly, it is judged whether the transmission request for the list has been received (S21). When the transmission request for the list has been received (S21: Yes), the MFP 1 transmits the list of the files stored in the memory card 40 and the pseudo file for the reduced images of all of the image files (S22). When the step of S22 has been completed, or when the transmission request for the list has not been received in the step of S21 (S21: No), it is judged whether the transmission request for the thumbnail image file has been received (S23). When the transmission request for the thumbnail image file has been received (S23: Yes), the MFP 1 generates the reduced images obtained by reducing the plurality of images stored in the memory card 40 (S24). Then, the MFP 1 generates the thumbnail image file including the image data of the reduced images and the image specifying information, written in the web descriptive language, on the file name specifying the original image file of each of the plurality of thumbnail images (S25), and sends the thumbnail image file to the requesting source (S26).

When the step of S26 has been completed, or when the transmission request for the thumbnail image file has not been received in the step of S23 (S23: No), it is judged whether the transmission request for an original image file including an original image has been received (S27). When the transmission request for the original image file has been received S27: Yes), the MFP 1 sends the original image to the requesting source (S28). Meanwhile, when the transmission request for the original image file has not been received (S27: No), or when the step of S28 has been completed, the process goes back to the step of S21.

Hereinabove, as explained based on the embodiment, when the transmission request for the list of the files has been received, the MFP 1 returns the list in which the thumbnail image file that has not been generated is listed as if already having the thumbnail image file. Then, when the transmission request for the thumbnail image file has been received, the MFP 1 generates and sends the thumbnail image file.

Accordingly, in the removable medium device that performs the network communication in the network based on the FTP, it is possible to send the thumbnail image to the requesting source such as the PC 20. Thereby, the PC 20 can display the thumbnail image, and the user can select an image with reference to the thumbnail image.

Hereinabove, the present invention has been described based on the embodiment. However, the present invention is not limited to the aforementioned embodiment, and various sorts of modifications may be possible as far as they are within a technical scope which does not extend beyond a subject matter of the present invention.

For example, the card reader, which is incorporated into the MFP 1 in the aforementioned embodiment, may be a separate device having a single function of a card reader or a card reader/writer.

In addition, the card reader, which is controlled by the CPU included in the MFP 1 in the embodiment, may be connected with a computer via an interface such as a USB, and the computer may be connected with another computer via the network.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A removable medium device configured to transmit information stored in a removable medium via a network based on a predetermined communication protocol, comprising:
   a processor; and
   a memory device storing instructions for execution by the processor that cause the removable medium device to perform the steps of:
   reducing each of a plurality of original images stored in the removable medium and generating a reduced screen image in which the plurality of reduced images are arranged;
   generating an image file that includes the reduced screen image generated and image specifying information for specifying an original image in the removable medium for each of the plurality of reduced images arranged in the reduced screen image;
   sending the image file via the network; and
   sending the original image specified by the received image specifying information in response to receiving image specifying information that is included in the image file and which specifies one of the plurality of original images stored in the removable medium.

2. The removable medium device according to claim 1, configured to transmit information stored in the removable medium via the network based on an FTP (File Transfer Protocol).

3. The removable medium device according to claim 2, wherein generating the reduced screen image is based on a JPEG (Joint Photographic Experts Group) format, and
   wherein the image specifying information included in the image file is written in a web descriptive language.

4. The removable medium device according to claim 1, wherein the image file includes a memory location of the reduced screen image in the image file and a memory location of the image specifying information in the image file.

5. The removable medium device according to claim 1, wherein the image file includes a network address of the removable medium device.

6. A non-transitory computer usable medium containing computer readable instructions that cause a computer to control a removable medium device, configured to transmit information stored in a removable medium via a network based on a predetermined communication protocol, to:
 reduce each of a plurality of original images stored in the removable medium;
 generate a reduced screen image in which the plurality of reduced images are arranged;
 generate an image file that includes the reduced screen image generated by the reduced image generating system and image specifying information for specifying an original image in the removable medium for each of the plurality of reduced images arranged in the reduced screen image;
 send the image file generated by the image file generating system via the network; and
 in response to receiving image specifying information that is included in the image file sent by the image file sending system and specifies one of the plurality of original images stored in the removable medium, send the original image specified by the received image specifying information.

7. The non-transitory computer usable medium according to claim 6, wherein the removable medium device is configured to transmit information stored in the removable medium via the network based on an FTP (File Transfer Protocol).

8. The non-transitory computer usable medium according to claim 7, wherein the reduced screen image is generated based on a JPEG (Joint Photographic Experts Group) format, and
 wherein the image specifying information included in the image file is written in a web descriptive language.

9. The non-transitory computer usable medium according to claim 7, wherein the image file includes a memory location of the reduced screen image in the image file and a memory location of the image specifying information in the image file.

10. The non-transitory computer usable medium according to claim 6, wherein the image file includes a network address of the removable medium device.

11. A non-transitory computer usable medium containing computer readable instructions for controlling a network device connected with a removable medium device configured to transmit information stored in a removable medium via a network based on a predetermined communication protocol, the network device including a receiving system configured to receive the information stored in the removable medium via the network and a display system configured to display the information received by the receiving system, the instructions causing a computer to control the network device so as to:
 receiving an image file sent by the removable medium device, the image file including a reduced screen image with a plurality of reduced images generated by reducing a plurality of original images stored in the removable medium being arranged therein and image specifying information for specifying an original image in the removable medium for each of the plurality of reduced images;
 extracting the reduced screen image and the image specifying information separately from the image file;
 displaying the reduced screen image extracted from the image file on the display system; and
 in response to one of the plurality of reduced images included in the reduced screen image being selected, requesting the removable medium device to send an original image corresponding to the selected reduced image based on the image specifying information that is included in the received image file.

12. The non-transitory computer usable medium according to claim 11, wherein the instructions cause the computer to control the network device so as to receive the image file sent by the removable medium device via the network based on an FTP (File Transfer Protocol).

13. The non-transitory computer usable medium according to claim 12, wherein the reduced screen image is generated based on a JPEG (Joint Photographic Experts Group) format, and
 wherein the image specifying information included in the image file is written in a web descriptive language.

14. The non-transitory computer usable medium according to claim 11, wherein the image file includes a memory location of the reduced screen image in the image file and a memory location of the image specifying information in the image file, and
 wherein the instructions cause the computer to control the network device so as to display the reduced screen image extracted from the image file on the display system based on the memory location of the reduced screen image and the memory location of the image specifying information included in the image file.

15. The non-transitory computer usable medium according to claim 11,
 wherein the image file includes a network address of the removable medium device, and
 wherein the instructions cause the computer to control the network device so as to request the removable medium device to send the original image corresponding to the selected image based on the image specifying information and the network address of the removable medium device.

16. A removable medium device configured to transmit information stored in a removable medium via a network based on a predetermined communication protocol, the removable medium device being connected with an external device via the network, the removable medium device comprising:
 a processor; and
 a memory device storing instructions for execution by the processor that cause the removable medium device to perform the steps of:
 generating a pseudo file representing reduced images to be generated by reducing a plurality of original images stored in the removable medium in response to a request for a list of files stored in the removable medium issued from the external device;
 sending the pseudo file to the external device;
 reducing each of a plurality of original images stored in the removable medium and generating a reduced screen image in which the plurality of reduced images are arranged, in response to the pseudo file being selected at a side of the external device;
 generating an image file that includes the reduced screen image and image specifying information for specifying an original image in the removable medium for each of the plurality of reduced images arranged in the reduced screen image;
 sending the image file to the external device via the network; and
 sending to the external device via the network, in response to the image specifying information that is included in the image file, an original image stored in the removable medium corresponding to a reduced image that has been selected on the reduced screen image displayed at the side of the external device.

17. The removable medium device according to claim 16, configured to transmit information stored in the removable medium via the network based on an FTP (File Transfer Protocol).

18. The removable medium device according to claim 17, wherein generating the reduced screen image is based on a JPEG (Joint Photographic Experts Group) format, and
wherein the image specifying information included in the image file is written in a web descriptive language.

* * * * *